US012616902B2

(12) United States Patent
Green

(10) Patent No.: US 12,616,902 B2
(45) Date of Patent: May 5, 2026

(54) METHOD AND SYSTEM FOR GENERATING AN IMAGE REPRESENTING THE RESULTS OF A GAMING SESSION

(71) Applicant: Sony Interactive Entertainment Inc., Tokyo (JP)

(72) Inventor: Arran Green, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 402 days.

(21) Appl. No.: 18/097,988

(22) Filed: Jan. 17, 2023

(65) Prior Publication Data

US 2024/0238679 A1 Jul. 18, 2024

(51) Int. Cl.
*A63F 13/79* (2014.01)
*A63F 13/497* (2014.01)

(52) U.S. Cl.
CPC ............ *A63F 13/79* (2014.09); *A63F 13/497* (2014.09)

(58) Field of Classification Search
None
See application file for complete search history.

(56) References Cited

U.S. PATENT DOCUMENTS

2012/0275704 A1* 11/2012 Cok .................... G06F 16/5854
382/190
2014/0307980 A1* 10/2014 Hilt ......................... G06T 11/60
382/284

2016/0092088 A1* 3/2016 Doyle ................ H04N 21/8549
715/738
2016/0259420 A1* 9/2016 Kim ......................... G06F 3/017
2021/0093969 A1* 4/2021 McCoy .............. H04N 21/2187
2022/0358450 A1* 11/2022 Stephens ............... H04L 9/3213
2023/0128243 A1* 4/2023 Sundareson ... H04N 21/234345
2023/0362138 A1* 11/2023 Kotlarz ............... H04L 63/0428
2024/0096030 A1* 3/2024 Sutton ..................... A63F 13/46

OTHER PUBLICATIONS

PCT Notification of Transmittal of the International Search Report & the Written Opinion of the International Searching Authority, issued in corresponding PCT/2024/010751, mailed Jun. 3, 2024 (15 total pages).

* cited by examiner

*Primary Examiner* — Jason T Yen
(74) *Attorney, Agent, or Firm* — Kilpatrick Townsend & Stockton LLP

(57) ABSTRACT

A method for generating a moment asset to represent interactive activity that occurred during a session of gameplay includes executing an instance of a game for a user, with the executing generating state data descriptive of interactive activity occurring during the session, and examining the state data by a machine learning process, which extracts features for classification and input to a moment model. The method also includes accessing user profile data, which includes labeled user profile feature data that identifies characteristics of playing the game by the user and is input to the moment model. The method further includes outputting, by the moment model, two or more images and at least one text descriptor of interactive activities that occurred during the session, and inputting the images and text descriptor to an image generation artificial intelligence process with priority data to influence a layout of image content for the moment asset.

20 Claims, 9 Drawing Sheets

METHOD AND SYSTEM FOR GENERATING AN IMAGE REPRESENTING THE RESULTS OF A GAMING SESSION

BACKGROUND

Video game players often share memorable achievements from their gaming sessions with their friends via social media platforms, e.g., Discord, Twitch, YouTube, Twitter, etc. In some instances, the memorable achievements are captured in video clips or screenshots taken from a gaming session. The generation of such video clips or screenshots can be time-consuming and burdensome for the player because the player not only has to search through a recording of the gaming session to find the memorable achievements, but also typically must use specialized software to generate the video clips or screenshots. Further, from a network standpoint, this process of generating the video clips or screenshots is relatively inefficient and consequently consumes a significant amount of computing resources.

It is in this context that embodiments arise.

SUMMARY

In an example embodiment, a method for generating a moment asset to represent interactive activity that occurred during a session of gameplay of a game is provided. The method includes executing an instance of the game for a user, with the executing generating state data descriptive of interactive activity occurring during the session. The method also includes examining the state data by a machine learning process, where the machine learning process is configured to extract features from the state data for classification and input to a moment model. The method further includes accessing user profile data of the user, where the user profile data includes labeled user profile feature data that identifies characteristics of playing the game by the user. The labeled user profile feature data is input to the moment model. Still further, the method includes outputting, by the moment model, two or more images and at least one text descriptor of interactive activities that occurred during the session of gameplay of the game, and inputting the two or more images and the at least one text descriptor to an image generation artificial intelligence (IGAI) process with priority data to influence a layout of image content for the moment asset. The image content is a selective representation of certain interactive activity that occurred during the session of gameplay of the game.

In one embodiment, the moment asset is comprised of a blend of the two or more images of interactive activities that occurred during the session of gameplay of the game. In one embodiment, the moment asset is comprised of a structurally-arranged collage in which images of interactive activities that occurred during the session of gameplay of the game are arranged in an order based on priority ranking. In one embodiment, the moment asset is comprised of an arbitrarily-blended collage in which images of interactive activities that occurred during the session of gameplay of the game are randomly arranged.

In one embodiment, the moment asset is comprised of a hybrid collage in which one portion of the hybrid collage includes a structurally-arranged collage in which images of interactive activities that occurred during the session of gameplay of the game are arranged in an order based on priority ranking and another portion of the hybrid collage includes an arbitrarily-blended collage in which images of interactive activities that occurred during the session of gameplay of the game are randomly arranged. In one embodiment, the moment asset is certified to be authentic using a non-fungible token (NFT) recorded in a blockchain In another example embodiment, another method for generating a moment asset to represent interactive activity that occurred during a session of gameplay of a game is provided. The method includes executing an instance of the game for a user, with the executing generating state data descriptive of interactive activity occurring during the session. The method also includes examining the state data by a machine learning process, where the machine learning process is configured to extract features from the state data for classification and input to a moment model. The method further includes accessing user profile data of the user, where the user profile data includes labeled user profile feature data that identifies characteristics of playing the game by the user. The labeled user profile feature data is input to the moment model. Still further, the method includes outputting, by the moment model, two or more images and at least one text descriptor of interactive activities that occurred during the session of gameplay of the game, and inputting the two or more images and the at least one text descriptor to an image generation artificial intelligence (IGAI) process with priority data to influence a definition of digital content for the moment asset. The digital content is a selective representation of certain interactive activity that occurred during the session of gameplay of the game.

In one embodiment, the digital content is usable to construct an image to represent the moment asset. In one embodiment, the digital content is usable to construct a video to represent the moment asset. In one embodiment, the digital content is usable to construct a three-dimensional physical asset to represent the moment asset. In one embodiment, the moment asset is certified to be authentic using a non-fungible token (NFT) recorded in a blockchain.

In one embodiment, the three-dimensional physical asset is a statue, statuette, or figurine. In one embodiment, the statue, statuette, or figurine is certified to be authentic using an NFT recorded in a blockchain. In one embodiment, the three-dimensional physical asset is a medal or a token. In one embodiment, the medal or token is certified to be authentic using an NFT recorded in a blockchain.

In yet another example embodiment, a non-transitory computer readable medium containing program instructions for generating a moment asset to represent interactive activity that occurred during a session of gameplay of a game is provided. The execution of the program instructions by one or more processors of a computer system causes the one or more processors to carry out the operations of executing an instance of the game for a user, where the executing generates state data descriptive of interactive activity occurring during the session of gameplay of the game, examining the state data by a machine learning process, where the machine learning process is configured to extract features from the state data for classification and input to a moment model, accessing user profile data of the user, where the user profile data includes labeled user profile feature data that identifies characteristics of playing the game by the user, with the labeled user profile feature data being input to the moment model, outputting, by the moment model, two or more images and at least one text descriptor of interactive activities that occurred during the session of gameplay of the game, and inputting the two or more images and the at least one text descriptor to an image generation artificial intelligence (IGAI) process with priority data to influence a layout of image content for the moment asset. The image content is a selective representation of certain interactive activity that occurred during the session of gameplay of the game.

In one embodiment, the moment asset is comprised of a blend of the two or more images of interactive activities that occurred during the session of gameplay of the game. In one embodiment, the moment asset is comprised of a structurally-arranged collage in which images of interactive activities that occurred during the session of gameplay of the game are arranged in an order based on priority ranking. In one embodiment, the moment asset is comprised of an arbitrarily-blended collage in which images of interactive activities that occurred during the session of gameplay of the game are randomly arranged. In one embodiment, the moment asset is certified to be authentic using an NFT recorded in a blockchain Other aspects and advantages of the disclosures herein will become apparent from the following detailed description, taken in conjunction with the accompanying drawings, which illustrate by way of example the principles of the disclosures.

DETAILED DESCRIPTION

In the following description, numerous specific details are set forth in order to provide a thorough understanding of the example embodiments. However, it will be apparent to one skilled in the art that the example embodiments may be practiced without some of these specific details. In other instances, process operations and implementation details have not been described in detail, if already well known.

Embodiments of the present invention provide a method and system for generating an image representing the results of a gaming session. While a game is being played, state data is collected regarding the interactive activities occurring in the game during the gameplay. The state data can be collected for a single player or, in the case of multiplayer games, for multiple players. The state data is then parsed to understand the characteristics of the gameplay and the results achieved by one or more of the players in the game. Using the processed state data for a gaming session and labeled user profile feature data associated with one or more players in the game, a moment model outputs images and at least one text descriptor of interactive activities that occurred during the session of gameplay. The images and text descriptor generated by the moment model are input into an image generation artificial intelligence (IGAI) process, which generates a moment asset, e.g., an image, a video, or a 3-D structure, that is representative of gameplay that occurred in the session. By way of example, the moment asset can include scores, game highlights or other points of interest, goals achieved, and the like. The moment asset is unique every time and not just a compilation of assets because the IGAI process that generates the moment asset includes a randomizing function. Moreover, in some cases, the moment asset can look even better than content from the game because the IGAI process does not require content from the game to generate an image, but instead can use content from the game as a style guide. At the end of a gaming session, a player has the option to receive a moment asset, e.g., an image representative of certain interactive activity that occurred during the session, as a remembrance of the game. The player can share the moment asset among friends or use the moment asset as a "trophy" to show others what the player achieved in the game.

Figure 1:
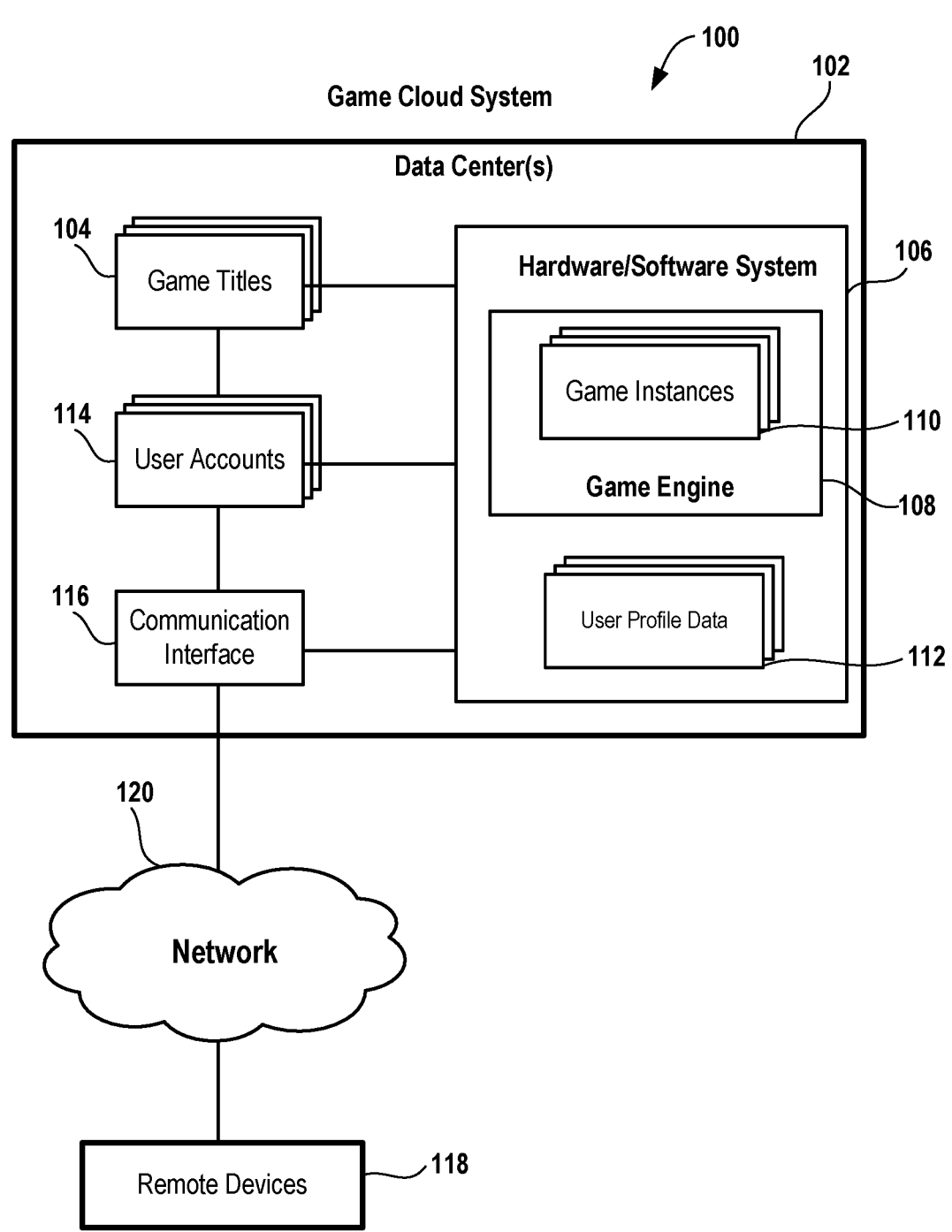
FIG. 1 is a simplified schematic diagram that illustrates a data center for a game cloud system, in accordance with one embodiment.

FIG. 1 is a simplified schematic diagram that illustrates a data center for a game cloud system, in accordance with one embodiment. As shown in FIG. 1, game cloud system 100 includes data center 102, which includes, among other infrastructure, servers, data storage, streaming logic, user account management, and other services to enable gaming. In one embodiment, game cloud system 100 includes a plurality of data centers 102 which are dispersed geographically throughout a region, e.g., a country or a group of countries. In this embodiment, the data centers are interconnected so that the data centers can work together.

Each data center 102 has access to all of the game titles 104 available via the game cloud system 100. By way of example, the catalog of game titles 104 available via the game cloud system 100 can include games A, B, C, D, E, F, and X. In the event a user transmits a request to play a game, e.g., Game X, Game X is loaded into memory of hardware/software system 106 and the game engine 108 of the hardware/software system generates a game instance 110 of Game X, as will be explained in more detail with reference to FIG. 2. The game instance 110 of Game X is generated using user profile data 112 of the user requesting to play the game. The user profile data 112 is taken from user accounts 114, which stores the user data, e.g., user profile data, for each user of game cloud system 100. The user can gain access to the game cloud system 100 via communication interface 116. By way of example, the user can use any suitable remote device 118, e.g., a computer, a tablet, a smartphone, a TV, or a head-mounted display (HMD), to connect to communication interface 116 via network 120, e.g., the internet. The communication interface 116 verifies the user's credentials, e.g., user name and password, and then grants the user access to the game cloud system 100 so the user can play game instance 110 of Game X. As noted above, the game instance 110 of Game X is generated using the user profile data 112 of the user requesting to play the game. Thus, if the user, e.g., user A, has played Game X before and user A's user profile data 112 indicates that user A is currently on level 12 of Game X, then the game engine

108 of hardware/software system 106 will generate a game instance 110 that takes user A to level 12 of Game X.

Figure 2:
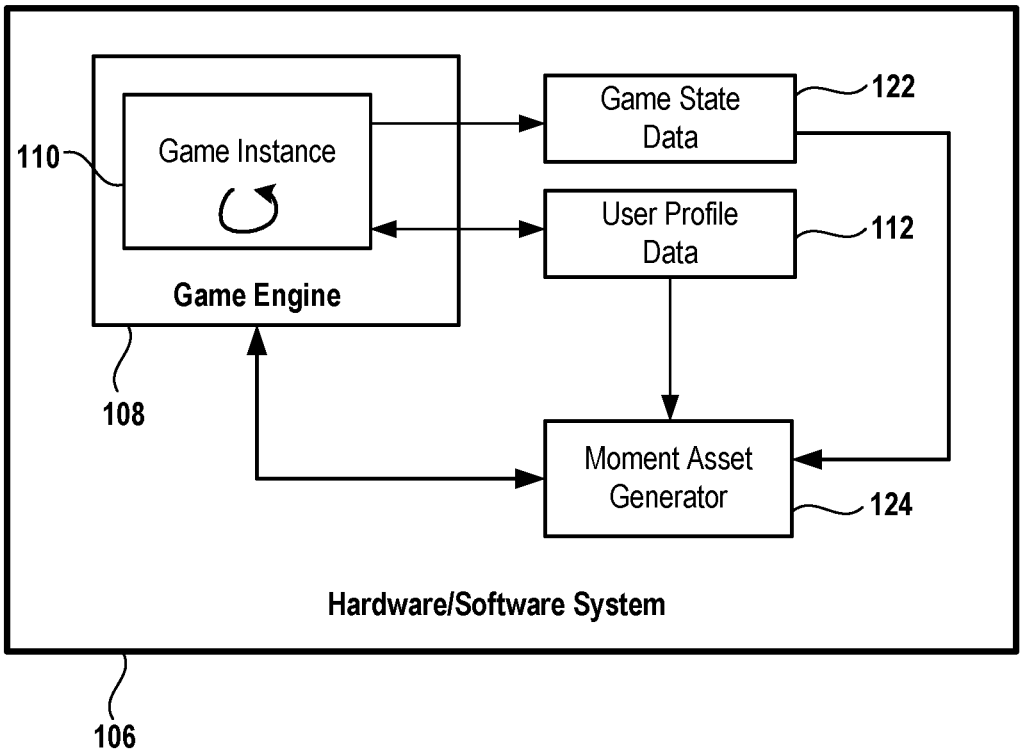
FIG. 2 shows a more detailed view of the hardware/software system of the game cloud system shown in FIG. 1, in accordance with one embodiment.

FIG. 2 shows a more detailed view of the hardware/software system of the game cloud system shown in FIG. 1, in accordance with one embodiment. As shown in FIG. 2, game engine 108 of hardware/software system 106 is executing a game instance 110 of one of game titles 104 (see FIG. 1), e.g., Game X. As is known to those skilled in the art, game engine 108 includes various game components and tools needed to run Game X, e.g., graphics, lighting, shading, texturing, etc. During execution of game instance 110 of Game X, moment asset generator 124 communicates with storage in the hardware/software system 106 to obtain user profile data 112 and game state data 122. The user profile data 112 enables the moment asset generator 124 to identify the user and to ascertain the user's game play history, e.g., game plays, scores, trophies, etc. The game state data 122, which is continuously being collected and stored as the game instance 110 of Game X is being executed, provides a stream of metadata descriptive of what is happening in the game. By way of example, the metadata (e.g., a list of data) can include what the user did in the game, what buttons were pushed, and what the user achieved (e.g., did the user win, lose, etc.). The moment asset generator 124 also communicates with game engine 108 to obtain images identified in game state data 122 so that these images can be used in the generation of moment assets, as will be described in more detail below. Additional details regarding the functionality of moment asset generator 124 are described below with reference to FIGS. 3A and 3B.

Figure 3A:
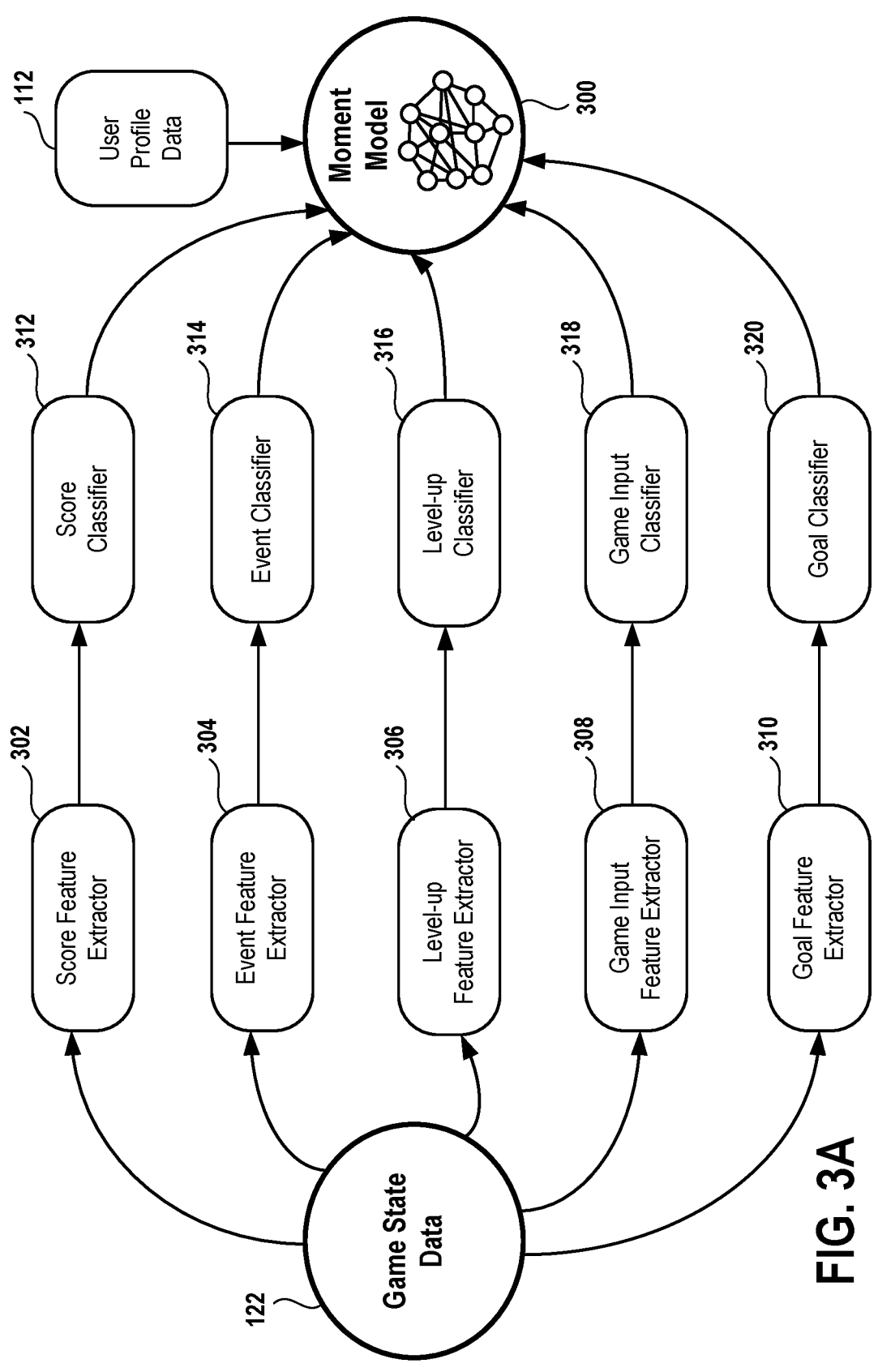
FIGS. 3A and 3B are simplified schematic diagrams that illustrate a moment identification process in which a moment model is used to identify potential moments in a game session using game state data and user profile data, in accordance with one embodiment.
Figure 3B:
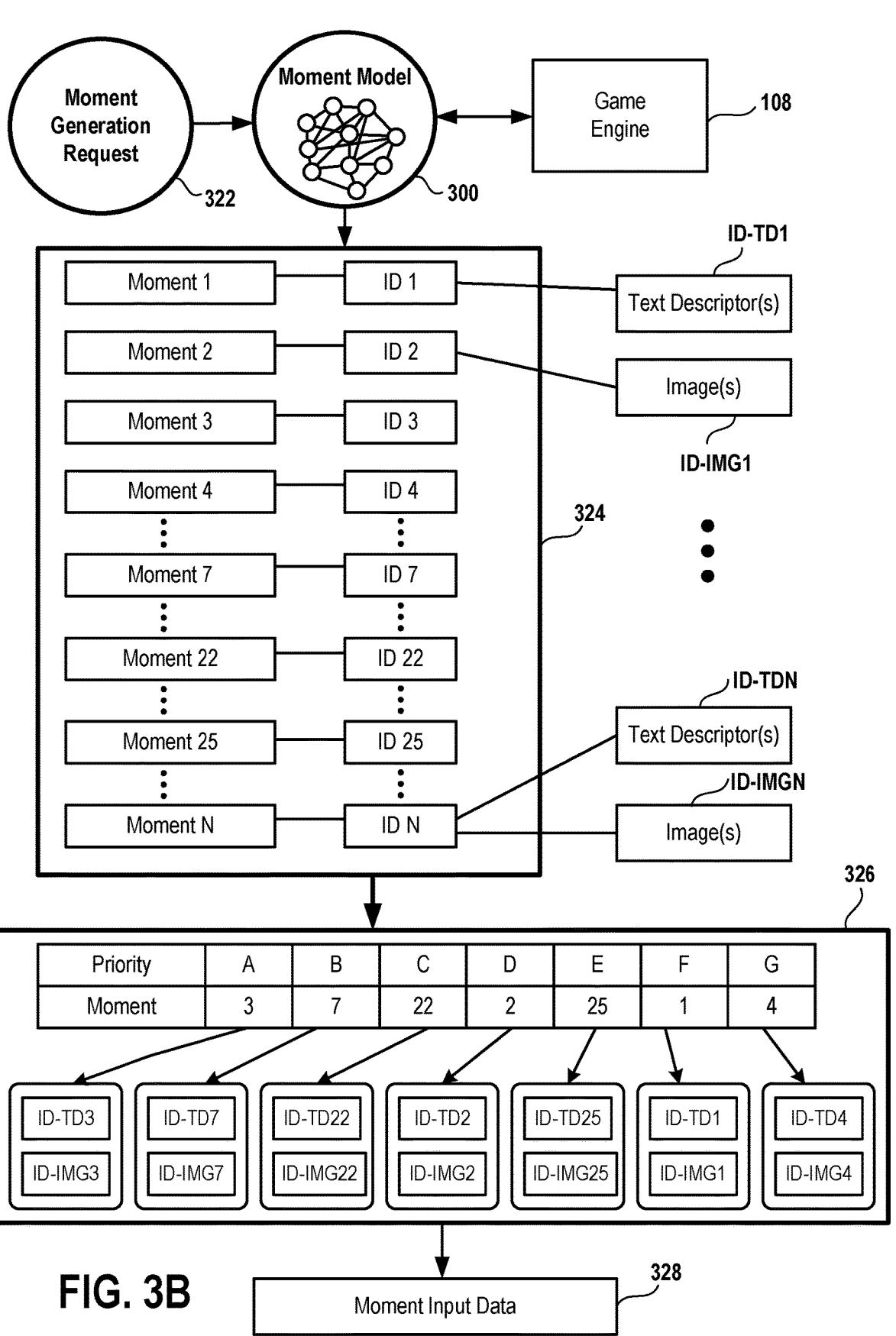

FIGS. 3A and 3B are simplified schematic diagrams that illustrate a moment identification process in which a moment model is used to identify potential moments in a game session using game state data and user profile data, in accordance with one embodiment. In one embodiment, the moment identification process is implemented by the moment asset generator 124 (see FIG. 2). As shown in FIG. 3A, user profile data 112 and game state data 122 are provided to moment model 300. In one embodiment, the user profile data 112 includes labeled user profile feature data that identifies characteristics of the user, e.g., feature data that identifies how the user plays the game. In one embodiment, the user profile data 112 undergoes feature extraction and classification processing to generate the labeled user profile feature data that is provided to the moment model 300.

The game state data 122 is provided to the moment model 300 after being processed to determine what information is contained in the game state data. In one embodiment, the game state data 122 is processed by a plurality of feature extractors that include score feature extractor 302, event feature extractor 304, level-up feature extractor 306, game input feature extractor 308, and goal feature extractor 310. In one embodiment, the feature extractors are pieces of code that identify a predefined feature in the game state data 122 and extract that feature when it is identified in the game state data. The score feature extractor 302 scans the game state data 122 and extracts features that relate to the user scoring points in the game for successfully performing game moves, e.g., the user passed two cars in a racing game and earned 25 points, or for successfully achieving a game objective, e.g., the user zapped a prescribed number of ghosts and earned 50 points. The event feature extractor 304 scans the game state data 122 and extracts features that relate to significant events experienced by the user during the game, e.g., achieving a key objective in the game, obtaining a new game item such as a shield, a sword, or a vehicle, or sharing a communication with another user. Level-up feature extractor 306 scans the game state data 122 and extracts features that relate to metrics associated with leveling up in the game, e.g., how long it took to advance from level 4 to level 5, gaining more powers in the game by defeating the dragon, etc. Game input feature extractor 308 scans the game state data 122 and extracts features related to game input from the user, e.g., what buttons were pressed, how fast were the buttons pressed, what data was collected from inertial sensors, etc. Goal feature extractor 310 scans the game state data 122 and extracts features regarding the user accomplishing a goal in the game, e.g., capturing the flag, winning a trophy, posting a new personal high score, etc.

The features extracted by score feature extractor 302, event feature extractor 304, level-up feature extractor 306, game input feature extractor 308, and goal feature extractor 310 are then labeled for use in the moment model 300 by score classifier 312, event classifier 314, level-up classifier 316, game input classifier 318, and goal classifier 320, respectively. Each of the classifiers 312-320 adds an appropriate label to each extracted feature which is considered useful for training the moment model 302. Thus, not all extracted features are assigned a label by the various classifiers.

In one embodiment, score classifier 312 looks at the features extracted by score feature extractor 302 and adds an appropriate label to each feature which is considered useful for training the moment model 300. In one embodiment, score classifier 312 is a piece of code that looks at the features extracted by score feature extractor 302 and adds a predefined label to those score features considered useful for training the moment model 300, where the predefined label describes the nature of the score feature. By way of example, if a score feature involves scoring a relatively high number of points, e.g., 100 points, for a jump move, the predefined label for the feature could be "high score-jump." If a score feature involves scoring a relatively low number of points, e.g., 5 points, the predefined label for this feature could be "low score." This same feature labeling methodology is also applied to the features extracted by event feature extractor 304, level-up feature extractor 306, game input feature extractor 308, and goal feature extractor 310, as described in more detail below.

In one embodiment, event classifier 314 looks at the features extracted by event feature extractor 304 and adds an appropriate label to each feature which is considered useful for training the moment model 300. In one embodiment, event classifier 314 is a piece of code that looks at the features extracted by event feature extractor 304 and adds a predefined label to those event features considered useful for training the moment model 300, where the predefined label describes the nature of the game event, e.g., "new game item obtained."

In one embodiment, level-up classifier 316 looks at the features extracted by level-up feature extractor 306 and adds an appropriate label to each feature which is considered useful for training the moment model 300. In one embodiment, level-up classifier 316 is a piece of code that looks at the features extracted by level-up feature extractor 306 and adds a predefined label to those features, e.g., level-up metrics, considered useful for training the moment model 300, where the predefined label describes the nature of the level-up metrics. By way of example, if the level-up metrics relate to gaining more power in the game by defeating the dragon, then the predefined label for the level-up metrics could be "gain power-dragon."

In one embodiment, game input classifier 318 looks at the features extracted by game input feature extractor 308 and adds an appropriate label to each game input feature considered useful for training the moment model 300. In one embodiment, game input classifier 318 is a piece of code that looks at the features extracted by game input feature extractor 308 and adds a predefined label to those game input features considered useful for training the moment model 300, where the predefined label describes the nature of the game input, e.g., "X-Y button combination."

In one embodiment, goal classifier 320 looks at the features extracted by goal feature extractor 310 and adds an appropriate label to each goal feature considered useful for training the moment model 300. In one embodiment, goal classifier 320 is a piece of code that looks at the features extracted by goal feature extractor 310 and adds a predefined label to those goal features considered useful for training the moment model 300, where the predefined label describes the nature of the goal accomplished in the game. By way of example, if a goal feature relates to a user winning a trophy for a strong performance in a game, the predefined label for the goal feature could be "trophies."

The classified features (the extracted features to which a label has been added) generated by the score classifier 312, the event classifier 314, the level-up classifier 316, the game input classifier 318, and the goal classifier 320 as well as the labeled user profile feature data from the user profile data 112 are fed into the moment model 300. In one embodiment, the moment model 300 is a deep learning model that takes the classified features (including the classified features from the game state data and the labeled user profile feature data) for the user's current gaming session and, using deep learning algorithms, conducts deep learning node processing in which mathematics is applied to identify clusters, similarities, and patterns. During this processing, the moment model 300 creates feature nodes and unique strengths between the various feature nodes. As more game activities occur during the gaming session, the strengths between some of the feature nodes can increase or decrease. The strengths between some of the feature nodes also can increase or decrease via reinforced learning, e.g., when positive or negative feedback is received.

At this point, the moment asset generator 124 (see FIG. 2) uses program instructions and logic to cause a moment generation request to be sent to the moment model 300. As shown in FIG. 3B, moment generation request 322 is sent to moment model 300. In response to the moment generation request 322, moment model 300 produces moments 324. As used herein, the term "moment" refers to digital content related to an interactive activity, a development, or other occurrence that takes place during a session of gameplay of a game. In some embodiments, the moment can have significance to the user, e.g., the user set a new personal scoring record during the gaming session. In other embodiments, the moment may not be significant to the user, but may be objectively or subjectively interesting or the moment can identify an event that is associated with a game scene or actions performed in one or more game scenes. In still other embodiments, the moment might be interesting because two or more players achieved a goal together, participated in an event together, or jointly performed a task. In one embodiment, the moment model 300 determines whether the interactive activity, development, or occurrence during the session of gameplay of the game should be identified by comparing the interactive activity, development, or occurrence to what other users have achieved in the game, to what the user has previously achieved in the game, or to what a group of two or more players has achieved in the game.

Moments 324 include a plurality of moments in a game that could potentially be included in a moment asset that is representative of the user's current gaming session. As shown in FIG. 3B, moments 324 include Moment 1, Moment 2, Moment 3, . . . , Moment N. Each of these moments includes a natural language descriptor that summarizes the moment. By way of example, the natural language descriptor for Moment 1 could be "beat the boss." Further, each of Moment 1, Moment 2, Moment 3, . . . , Moment N is associated with a moment identifier. In particular, as shown in FIG. 3B, moment identifier ID 1 is associated with Moment 1, moment identifier ID 2 is associated with Moment 2, moment identifier ID 3 is associated with Moment 3, and so on through moment identifier ID N, which is associated with Moment N. As shown in FIG. 3B, moment identifier ID 1 is associated with text descriptor(s) ID-TD1 and image(s) ID-IMG1 each of which is associated with Moment 1. In one embodiment, moment identifier ID 1 includes a) pointers to the engineered text descriptor(s) ID-TD1 that will be used as input for image generation artificial intelligence (IGAI) processing, and b) pointers to the location at which images ID-IMG1, which are obtained by the moment model 300 from game engine 108, are stored. Similarly, in one embodiment, moment identifier ID N includes a) pointers to the engineered text descriptor(s) ID-TDN that will be used as input for image generation artificial intelligence (IGAI) processing, and b) pointers to the location at which images ID-IMGN, which are obtained by the moment model 300 from game engine 108, are stored. Although not shown in FIG. 3B for ease of viewing, it is to be understood that each of the other moment identifiers, e.g., moment identifiers ID 2 thru ID N−1, also includes a) pointers to engineered text descriptor(s) that will be used as input for IGAI processing, and b) pointers to the location at which images associated with the particular moment are stored.

In a moment filtering operation 326, moments 324 are prioritized. In one embodiment, the moment filtering operation 326 includes assigning a priority ranking to each moment 324. As shown in FIG. 3B, Moment 3 has been assigned priority A, Moment 7 has been assigned priority B, Moment 22 has been assigned priority C, Moment 2 has been assigned priority D, Moment 25 has been assigned priority E, Moment 1 has been assigned priority F, and Moment 4 has been assigned priority G. In one embodiment, the moment filtering operation 326 assigns the priority ranking to each moment 324 based on the relative importance of the moment. The relative importance of each moment 324 can be determined using any suitable criteria for assessing interactive activity in a game. In one embodiment, the relative importance of each moment 324 is based on a number of factors including the difficulty of the game, a comparison of the user's performance during the gaming session to the user's prior performances in the game, and/or a comparison of the user's performance during the gaming session to the performance of other users in the game. By way of example, if a moment 324 involves a user scoring 50 points, which is a new high score in the game for the user, then the priority ranking for the moment could be relatively high, e.g., priority A or priority B, to indicate that this moment is relatively important to the user. The priority ranking for each moment 324 can be used in connection with the formulation of the layout of a moment asset, as will be explained in more detail below with reference to FIG. 4A.

Thereafter, in a moment input data selection operation 328, a number of moments 324 are selected to be used as moment input data for image generation artificial intelligence (IGAI) processing. The number of moments 324 selected to be used as moment input data can be varied as needed to generate suitable moment assets. In some embodiments, the number of moments 324 selected is hard programmed to be a fixed number, e.g., 2 moments, 3 moments, 4 moments, 5 moments, etc. In other embodiments, the number of moments 324 selected can be dynamically set by, e.g., an algorithm. In one embodiment, the moments 324 selected to be used as moment input data include the moments having the highest priority ranking, e.g., the top 3 moments or the top 5 moments. In the example shown in FIG. 3B, the top 5 moments (based on priority ranking) are selected to be used as moment input data. Thus, in this example, the selected moments include Moments 3, 7, 22, 2, and 25 (with priority rankings of A, B, C, D, and E, respectively). Those skilled in the art will appreciate that the number of moments 324 selected to be used as moment input data is a matter of choice and can be varied to obtain a moment asset having whatever aesthetic appearance is considered to be most desirable. By way of example, in the case of a car racing game, it could be that moment assets that include a blend of 2 or 3 images are considered to have a preferred aesthetic appearance, whereas, in the case of an adventure game, it could be that moment assets that include a blend of 4 or 5 images are considered to have a preferred aesthetic appearance.

Figure 4A:
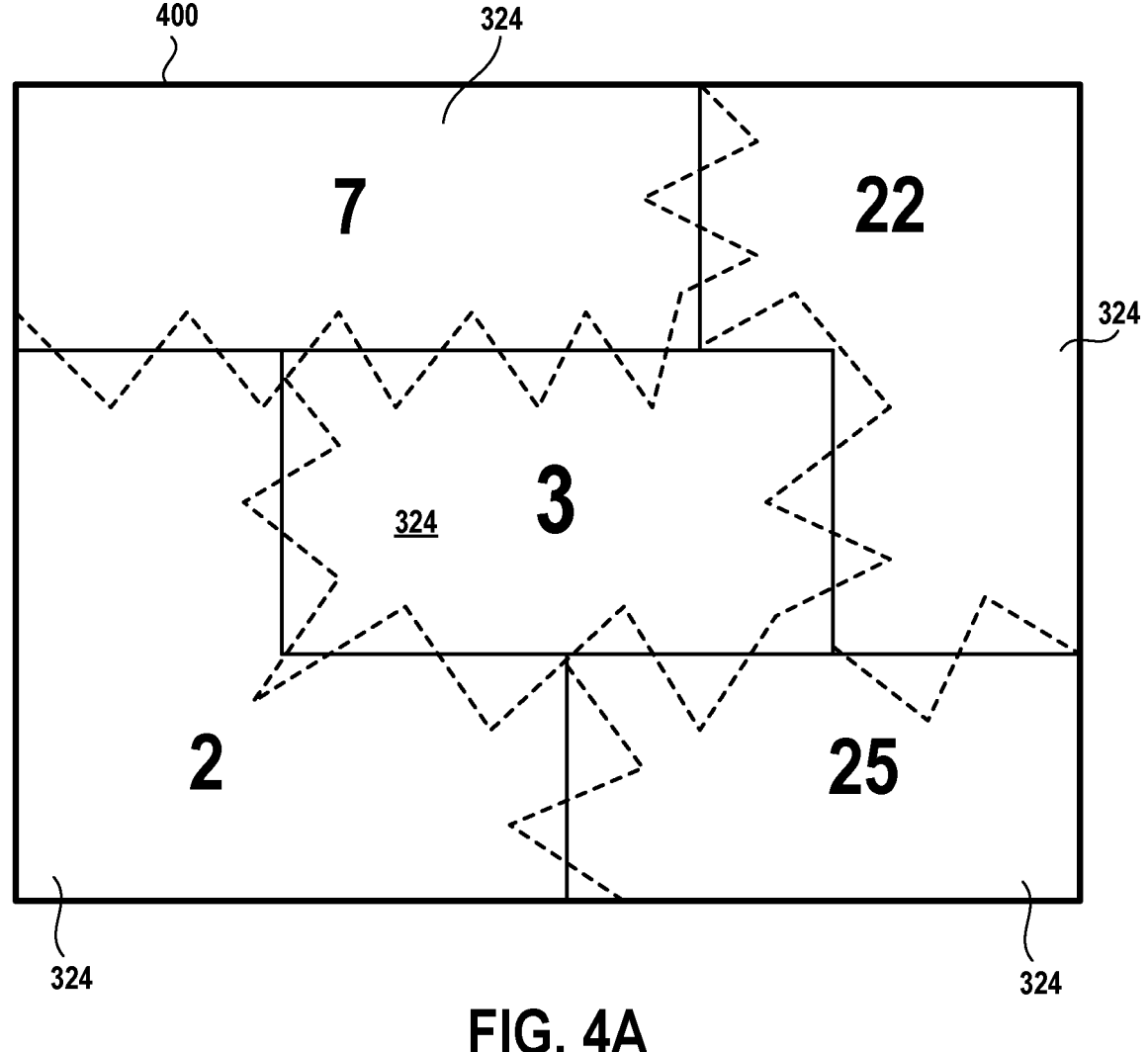
FIG. 4A illustrates an example layout of a moment asset, in accordance with one embodiment.

FIG. 4A illustrates an example layout of a moment asset, in accordance with one embodiment. As shown in FIG. 4A, moment asset 400 includes a plurality of moments 324, which correspond to the moments selected to be used as moment input data in the example of FIG. 3B. In particular, the moments 324 shown in FIG. 4A include Moments 3, 7, 22, 2, and 25 in the example of FIG. 3B. As shown in FIG. 4A, the layout format of moment asset 400 is a structurally-arranged collage in which Moments 3, 7, 22, 2, and 25 are arranged in order, e.g., an order based on priority ranking. Moment 3, which has a priority ranking of A (the highest priority ranking), is prominently situated in the center of the moment asset 400. Moments 7, 22, 2, and 25, each of which has a lower priority ranking relative to Moment 3, are situated in less prominent positions around Moment 3 along the periphery of moment asset 400. In another embodiment, the layout format of moment asset 400 is an arbitrarily-blended collage in which the moments 324 are randomly arranged. In yet another embodiment, the layout format of moment asset 400 is a hybrid collage in which one portion of the collage includes arbitrarily-blended images and another portion of the collage includes structurally-arranged images.

The moments 324 included in the moment asset 400 can be discrete elements, e.g., separate images, or can be blended together with other moments, e.g., multiple images joined together by creating suitable transitions between the images. As shown in FIG. 4A, the solid lines defining the boundaries between the moments 324 indicate that the moments are included in the moment asset 400 as discrete elements, e.g., separate images. On the other hand, the dashed lines defining the boundaries between moments 324 indicate transitions between the moments that have been created to blend adjoining images together. In a case where the moment asset 400 is a hybrid collage, some moments 324 can be included as discrete elements and other moments can be blended together to create a desired aesthetic appearance.

Figure 4B:
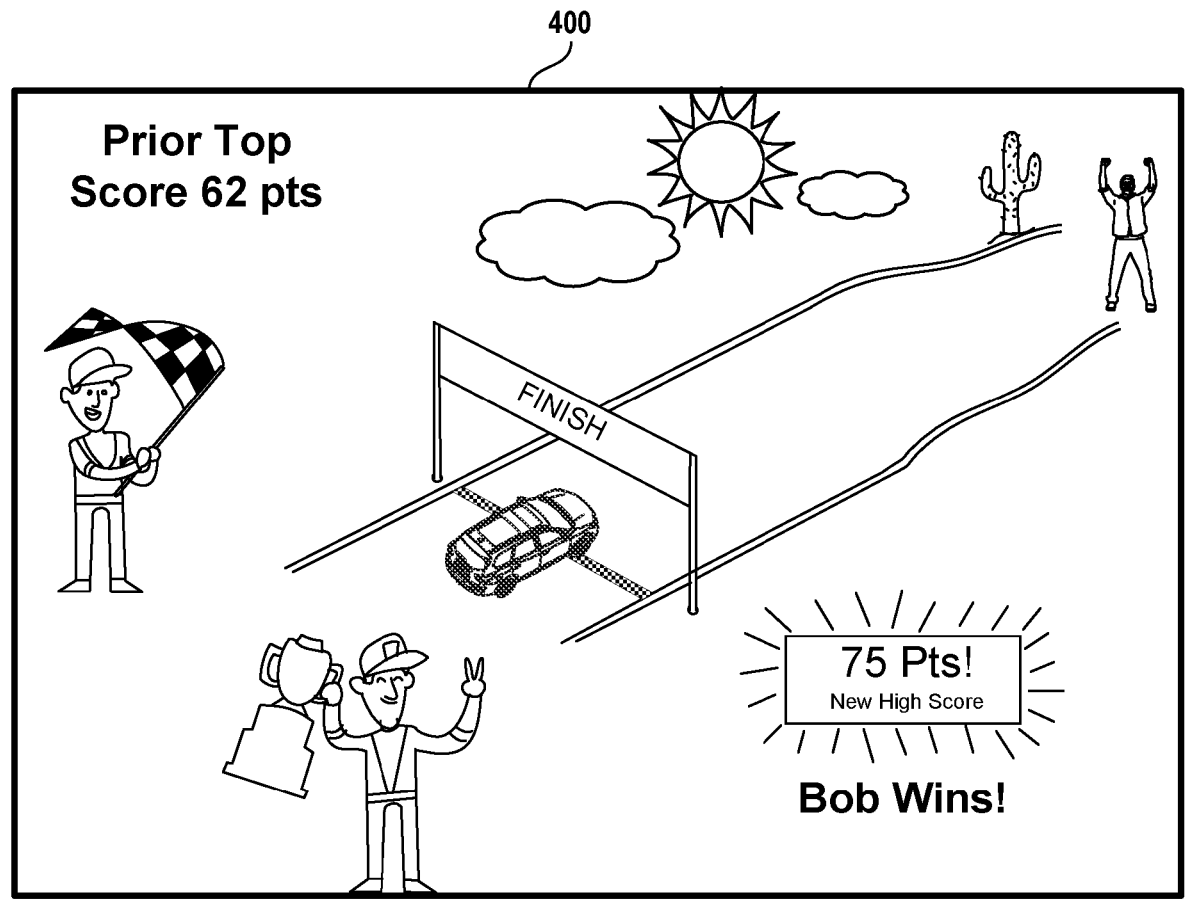
FIG. 4B shows an example of a moment asset, in accordance with one embodiment.

FIG. 4B shows an example of a moment asset, in accordance with one embodiment. As shown in FIG. 4B, moment asset 400 includes a number of moments from a session of an off-road car racing game. In particular, the center portion of moment asset 400 includes an image of the user's car crossing the finish line of a race course in the desert. The lower right-hand portion of moment asset 400 indicates that Bob (the user) won the race with a new high score of 75 points. The upper left-hand portion of moment asset 400 indicates that Bob's prior top score for the game was 62 points. The lower left-hand portion of moment asset 400 includes an image of Bob holding a trophy for winning the race. Other images in moment asset 400 include an official waving a checkered flag (on the left-hand side) and a spectator celebrating Bob's win (in the upper right-hand portion). For ease of illustration, the moment asset 400 shown in FIG. 4B appears as a collection of separate images having a somewhat disjointed appearance rather than a unified image having a realistic appearance, e.g., a collage in which the various images are blended together to create the unified image. In one embodiment, the unified image is created by using a unifying background (or combination of unifying backgrounds). By way of example, in the moment asset 400 shown in FIG. 4B, unifying backgrounds such as the sky, the ground, and the race course could be used to create a unified image having a realistic appearance (e.g., an appearance that does not appear disjointed or otherwise unrealistic). In one embodiment, the moment asset is a unified image configured to have an appearance similar to that of a cinematic poster in which the user is prominently featured, e.g., in a heroic pose. In other embodiments, the cinematic poster can feature a "magic" moment that occurred during the gaming session, e.g., the user setting a new speed record in a racing game.

In the example embodiment of FIG. 4B, the moment asset 400 is a digital image that can be provided to the user in any suitable image file format, e.g., JPEG (JPG), PNG, GIF, TIFF, and RAW. Those skilled in the art will appreciate that the data, e.g., digital content, used to generate the moment asset also can be output in forms other than a digital image. For example, the moment asset can be output as a three-dimensional (3-D) representation of a moment from a gaming session. In one embodiment, the moment asset is output as a 3-D physical asset generated using 3-D printing techniques, e.g., a statue, statuette, or figurine. In another embodiment, the 3-D physical asset generated using 3-D printing techniques is a medal, e.g., a medal of achievement, or a token. In this embodiment, the user can be given the option to customize the medal or token in accordance with the user's preference. The data used to generate the moment asset also can be output in video or audio form. In yet another embodiment, a physical representation of the moment asset is created, e.g., a framed image, and a link back to the digital representation, e.g., an image or video, is provided to the user.

In one embodiment, the moment asset is certified to be authentic using a non-fungible token (NFT) associated with a digital file referencing the moment asset, which, as described above, can be either a digital moment asset, e.g., an image of a moment, or a physical moment asset, e.g., a 3-D representation of a moment. As is known to those skilled in the art, the NFT is recorded in a blockchain and thus can be used to certify the authenticity and ownership of the referenced moment asset. In this manner, the referenced moment asset can become a collectible.

In one embodiment, the generation of an output image, graphics, and/or three-dimensional representation by an image generation artificial intelligence (IGAI) can include one or more artificial intelligence (AI) processing engines and/or models. In general, an AI model is generated using training data from a data set. The data set selected for training can be custom curated for specific desired outputs and in some cases the training data set can include wide ranging generic data that can be consumed from a multitude of sources over the internet. By way of example, an IGAI should have access to a vast of amount of data, e.g., images, videos, and three-dimensional data. The generic data is used by the IGAI to gain understanding of the type of content desired by an input. For instance, if the input is requesting the generation of a tiger in the Sahara Desert, the data set should have various images of tigers and deserts to access and draw upon during the processing of an output image. The curated data set, on the other hand, maybe be more specific to a type of content, e.g., video game related art, videos, and other asset-related content. Even more specifically, the curated data set could include images related to specific scenes of a game or actions sequences including game assets, e.g., unique avatar characters and the like. As described above, an IGAI can be customized to enable entry of unique descriptive language statements to set a style for the requested output images or content. The descriptive language statements can be text or other sensory input, e.g., inertial sensor data, input speed, emphasis statements, and other data that can be formed into an input request. The IGAI also can be provided images, videos, or sets of images to define the context of an input request. In one embodiment, the input can be text describing a desired output along with an image or images to convey the desired contextual scene being requested as the output.

In one embodiment, an IGAI is provided to enable text-to-image generation. Image generation is configured to implement latent diffusion processing, in a latent space, to synthesize the text to image processing. In one embodiment, a conditioning process assists in shaping the output toward a desired output, e.g., using structured metadata. The structured metadata may include information gained from the user input to guide a machine learning model to denoise progressively in stages using cross-attention until the processed denoising is decoded back to a pixel space. In the decoding stage, upscaling is applied to achieve an image, video, or 3D asset that is of higher quality. The IGAI is therefore a custom tool that is engineered to processing specific types of input and render specific types of outputs. When the IGAI is customized, the machine learning and deep learning algorithms are tuned to achieve specific custom outputs such as, for example, unique image assets to be used in gaming technology, specific game titles, and/or movies.

In another configuration, the IGAI can be a third-party processor such as open-source Stable Diffusion available from Stable AI. Other third-party processors include OpenAI's GLIDE, OpenAI's DALL-E 2, MidJourney's processor of the same name, and Google's Imagen. In some configurations, the IGAI can be used online via one or more Application Programming Interface (API) calls. It should be understood that reference to available IGAI is only for informational reference. For additional information related to IGAI technology, reference may be made to a paper published by Ludwig Maximilian University of Munich entitled "High-Resolution Image Synthesis with Latent Diffusion Models," by Robin Rombach et al., pp. 1-45 (this paper is also available on the internet at URL: https:// ommer-lab.com/research/latent-diffusion-models/). The disclosure set forth in this paper is incorporated herein by reference for all purposes.

Figure 5A:
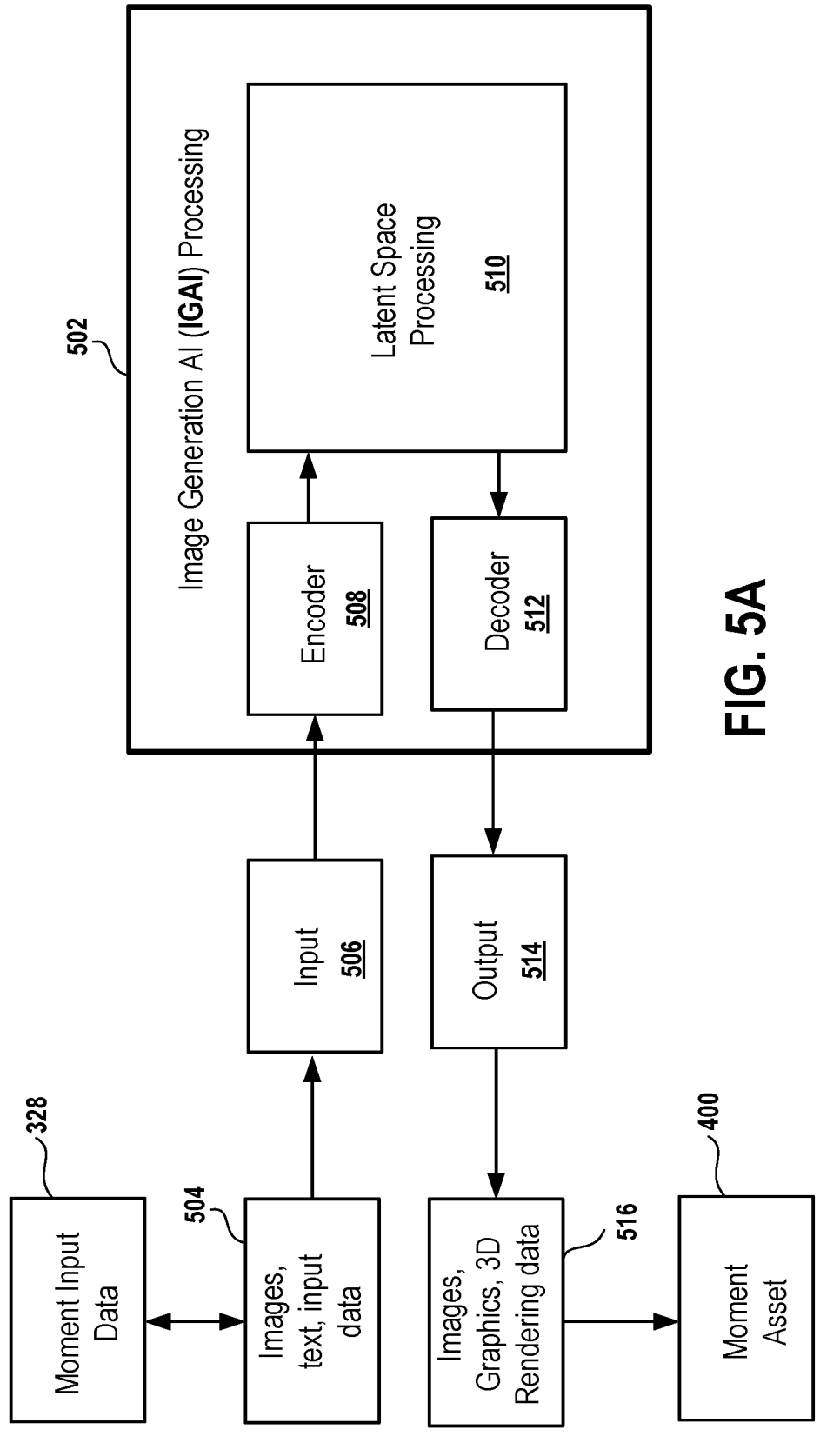
FIG. 5A is a general representation of an image generation artificial intelligence (IGAI) processing sequence, in accordance with one embodiment.

FIG. 5A is a general representation of an image generation AI (IGAI) 502 processing sequence, in accordance with one embodiment. As shown, input 506 is configured to receive input in the form of data, e.g., text description having semantic description or key words. The text description can in the form of a sentence, e.g., having at least a noun and a verb. The text description can also be in the form of a fragment or simply one word. The text can also be in the form of multiple sentences, which describe a scene or some action or some characteristic. In some configurations, the input text can also be input in a specific order so as to influence the focus on one word over others or even deemphasize words, letters, or statements. Still further, the text input can be in any form, including characters, emojis, icons, foreign language characters (e.g., Japanese, Chinese, Korean, etc.). In one embodiment, text description is enabled by contrastive learning. The basic idea is to embed both an image and text in a latent space so that text corresponding to an image maps to the same area in the latent space as the image. This abstracts out the structure of what it means to be a dog, for instance, from both the visual and textual representation. In one embodiment, a goal of contrastive representation learning is to learn an embedding space in which similar sample pairs stay close to each other while dissimilar ones are far apart. Contrastive learning can be applied to both supervised and unsupervised settings. When working with unsupervised data, contrastive learning is one of the most powerful approaches in self-supervised learning.

In addition to text, the input can also include other content, e.g., images. In some embodiments, the images themselves include descriptive content. The images can be interpreted using image analysis to identify objects, colors, intent, characteristics, shades, textures, three-dimensional representations, depth data, and combinations thereof. Broadly speaking, the input 506 is configured to convey the intent of the user that wishes to utilize the IGAI to generate some digital content. In the context of sharing memorable achievements in gaming, the target content to be generated can be a moment asset regarding a gaming session. In such a scenario, the data set used to train the IGAI and input 506 can be used to customize the way artificial intelligence, e.g., deep neural networks, process the data to steer and tune the desired output image, data, or three-dimensional digital asset.

In one embodiment, an input request 504 includes moment input data 328 and specifies a layout format for the generation of a moment asset. In one embodiment, the specified layout format for the moment asset is 1) an arbitrarily-blended collage, 2) a structurally-arranged collage, or 3) a hybrid collage in which one portion of the collage includes arbitrarily-blended images and another portion of the collage includes structurally-arranged images.

The input 506 is then passed to the IGAI, where an encoder 508 takes input data and/or pixel space data and converts this data into latent space data. The concept of "latent space" is at the core of deep learning, since feature data is reduced to simplified data representations for the purpose of finding patterns and using the patterns. The latent space processing 510 is therefore executed on compressed data, which significantly reduces the processing overhead as compared to processing learning algorithms in the pixel space, which is much heavier and would require significantly more processing power and time to analyze and produce a desired image. The latent space is simply a representation of compressed data in which similar data points are closer together in space. In the latent space, the processing is configured to learn relationships between learned data points that a machine learning system has been able to derive from the information that it gets fed, e.g., the data set used to train the IGAI. In latent space processing 510, a diffusion process is computed using diffusion models. Latent diffusion models rely on autoencoders to learn lower-dimension representations of a pixel space. The latent representation is passed through the diffusion process to add noise at each step, e.g., in multiple stages. Then, the output is fed into a denoising network based on a U-Net architecture that has cross-attention layers. A conditioning process is also applied to guide a machine learning model to remove noise and arrive at an image that represents close to what was requested via user input. A decoder 512 then transforms a resulting output from the latent space back to the pixel space. The output 514 may then be processed to improve the resolution. The output 514 is then passed out as the result 516, which may be an image, graphics, 3D data, or data that can be rendered to a physical form or a digital form. In one embodiment, the result 516 is a moment asset 400.

Figures 5B, 5C:
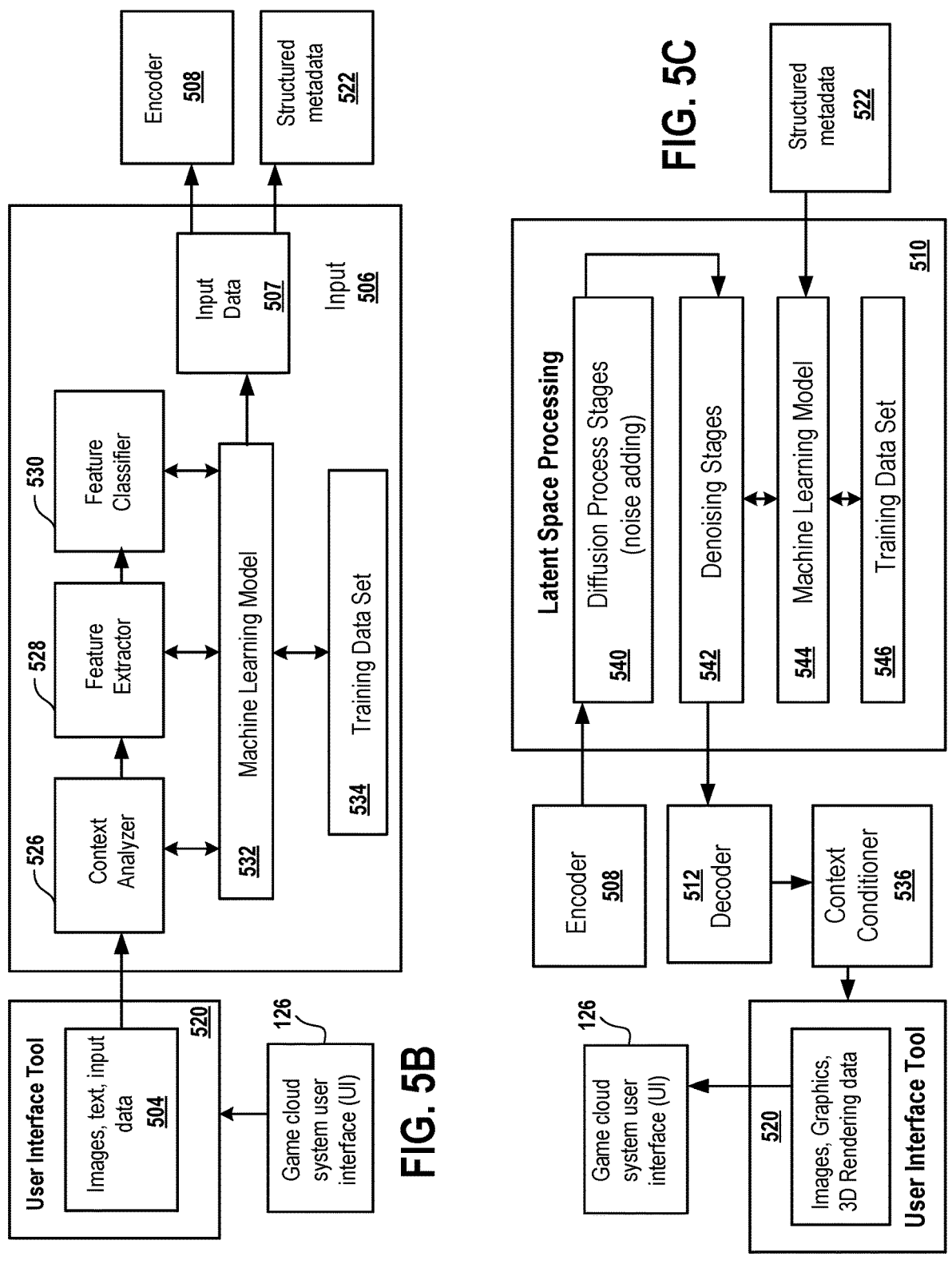
FIG. 5B illustrates additional processing that may be done to the input in connection with the IGAI processing sequence, in accordance with one embodiment.
FIG. 5C illustrates how the output of the encoder is fed into latent space processing in connection with the IGAI processing sequence, in accordance with one embodiment.

FIG. 5B illustrates, in one embodiment, additional processing that may be done to the input 506. A user interface tool 520 may be used to enable a user to provide an input request 504. In one embodiment, the input request 504 is provided by the user via a game cloud system user interface (UI) 126. In one embodiment, the game cloud system UI 126 is displayed to the user as part of the game. By way of example, upon completion of the game, the game cloud system UI 126 can display a screen that enables the user to request the generation of a moment asset, e.g., by providing input using a radio button, checkbox, dropdown list, or other suitable input element.

The input request 504, as discussed above, may be images, text, structured text, or generally data. In one embodiment, before the input request is provided to the encoder 508, the input can be processed by a machine learning process that generates a machine learning model 532, and learns from a training data set 534. By way of example, the input data may be processed via a context analyzer 526 to understand the context of the request. For example, if the input is "space rockets for flying to Mars," the input can be analyzed in context analyzer 526 to determine that the context is related to outer space and planets. The context analyzer 526 may use machine learning model 532 and training data set 534 to find related images for this context or identify specific libraries of art, images, or video. If the input request also includes an image of a rocket, the feature extractor 528 can function to automatically identify feature characteristics in the rocket image, e.g., fuel tank, length, color, position, edges, lettering, flames, etc. A feature classifier 530 can also be used to classify the features and improve the machine learning model 532. In one embodiment, the input data 507 can be generated to produce structured information that can be encoded by encoder 508 into the latent space. Additionally, it is possible to extract out structured metadata 522 from the input request. The structed metadata 522 may be, for example, descriptive text used to instruct the IGAI 502 to make a modification to a characteristic or change to the input images or changes to colors, textures, or combinations thereof. For example, the input request 504 could include an image of the rocket, and the text can say "make the rocket wider" or "add more flames" or "make it stronger" or some other modifier intended by the user (e.g., semantically provided and context analyzed). The structured metadata 522 can then be used in subsequent latent space processing to tune the output to move toward the user's intent. In one embodiment, the structured metadata may be in the form of semantic maps, text, images, or data that is engineered to represent the user's intent as to what changes or modifications should be made to an input image or content.

FIG. 5C illustrates how the output of the encoder 508 is then fed into latent space processing 510, in accordance with one embodiment. A diffusion process is executed by diffusion process stages 540, wherein the input is processed through a number of stages to add noise to the input image or images associated with the input text. This is a progressive process, where at each stage, e.g., 10-50 or more stages, noise is added. Next, a denoising process is executed through denoising stages 542. Similar to the noise stages, a reverse process is executed where noise is removed progressively at each stage, and at each stage, machine learning is used to predict what the output image or content should be, in light of the input request intent. In one embodiment, the structured metadata 522 can be used by a machine learning model 544 at each stage of denoising, to predict how the resulting denoised image should look and how it should be modified. During these predictions, the machine learning model 544 uses the training data set 546 and the structured metadata 522, to move closer and closer to an output that most resembles the intent of the requested input. In one embodiment, during the denoising, a U-Net architecture that has cross-attention layers may be used, to improve the predictions. After the final denoising stage, the output is provided to a decoder 512 that transforms that output to the pixel space. In one embodiment, the output is also upscaled to improve the resolution. The output of the decoder, in one embodiment, can be optionally run through a context conditioner 536. The context conditioner 536 is a process that may use machine learning to examine the resulting output to make adjustments to make the output more realistic or remove unreal or unnatural outputs. For example, if the input asks for "a boy pushing a lawnmower" and the output shows a boy with three legs, then the context conditioner can make adjustments with in-painting processes or overlays to correct or block the inconsistent or undesired outputs. However, as the machine learning model 544 gets smarter with more training over time, there will be less need for a context conditioner 536 before the output is rendered in the user interface tool 520. In one embodiment, the output rendered in the user interface tool 520 is a moment asset, and the moment asset is presented to the user on a display using the game cloud system UI 126.

The moment asset generated by the IGAI process is unique every time and not just a compilation of assets because the IGAI process includes a randomizing function. Thus, in a case in which the moment asset is an image, each image generated will be a new and unique image that did not previously exist. Further, the IGAI process does not require content from the game, but instead can use content from the game as a style guide. As such, in some cases, the IGAI process can generate an image (or other type of moment asset) that looks even better, e.g., has a better aesthetic appearance, than the game itself. Moreover, by providing feedback to the IGAI or by providing input ahead of time to the IGAI process via the game cloud system UI, the moment asset can be personalized or otherwise customized in accordance with the input provided by the user.

Figure 6:
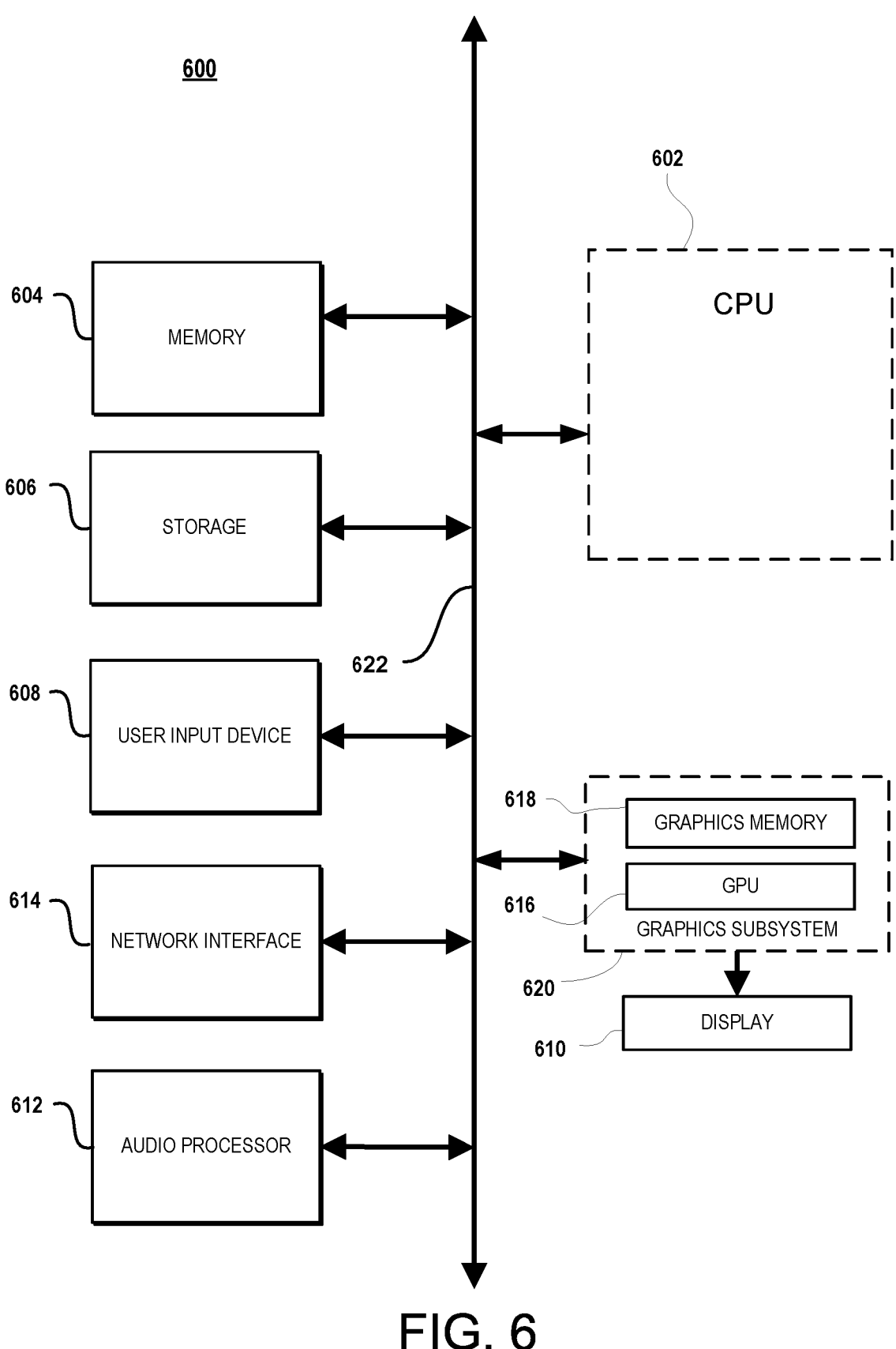
FIG. 6 illustrates components of an example device that can be used to perform aspects of the various embodiments of the present disclosure.

FIG. 6 illustrates components of an example device 600 that can be used to perform aspects of the various embodiments of the present disclosure. In particular, the block diagram of FIG. 6 illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be local to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 620 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted that access services, such as providing access to games of the current embodiments, delivered over a wide geographical area often use cloud computing. Cloud computing is a style of computing in which dynamically scalable and often virtualized resources are provided as a service over the internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the internet, based on how the internet is depicted in computer network diagrams and is an abstraction for the complex infrastructure it conceals.

A game server may be used to perform the operations of the durational information platform for video game players, in some embodiments. Most video games played over the internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as HTML, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs the detection of which does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the objects, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although method operations may be described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the telemetry and game state data are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Accordingly, the disclosure of the example embodiments is intended to be illustrative, but not limiting, of the scope of the disclosures, as set forth in the following claims. Although example embodiments of the disclosures have been described in some detail for purposes of clarity of understanding, it will be apparent that certain changes and modifications can be practiced within the scope and equivalents of the following claims. In the following claims, elements and/or steps do not imply any particular order of operation, unless explicitly stated in the claims or implicitly required by the disclosure.

What is claimed is:

1. A method for generating a moment asset to represent interactive activity that occurred during a session of gameplay of a game, comprising:

executing an instance of the game wherein the executing generates state data descriptive of interactive activity occurring during the session of gameplay of the game;

examining the state data by a machine learning process, wherein the machine learning process is configured to extract features from the state data for classification;

outputting, by the machine learning process, two or more images and at least one text descriptor of interactive activities that occurred during the session of gameplay of the game; and inputting the two or more images and the at least one text descriptor to an image generation process with priority data to influence a layout of image content for the moment asset, wherein the image content is a selective representation of certain interactive activity of a user that occurred during the session of gameplay of the game, wherein the moment asset comprises a combination of the two or more images of interactive activities that occurred during the session of gameplay output in a hybrid collage format, and wherein a first portion of the moment asset includes a first collage of the two or more images and has a first format, and wherein a second portion of the moment asset includes a second collage of the two or more images and has a second format different from the first format, wherein the first format and the second format each defines an arrangement of the two or more images within the moment asset.

2. The method of claim 1, wherein the image generation process comprises an image generation artificial intelligence process.

3. The method of claim 1, wherein the first portion of the moment asset is comprised of a structurally-arranged collage in which images of interactive activities that occurred during the session of gameplay of the game are arranged in an order based on priority ranking.

4. The method of claim 1, wherein the first portion of the moment asset is comprised of an arbitrarily-blended collage in which images of interactive activities that occurred during the session of gameplay of the game are randomly arranged.

5. The method of claim 1, wherein the first format includes a structurally-arranged collage in which images of interactive activities that occurred during the session of gameplay of the game are arranged in an order based on priority ranking and the second format includes an arbitrarily-blended collage in which images of interactive activities that occurred during the session of gameplay of the game are randomly arranged.

6. The method of claim 1, wherein the moment asset is certified to be authentic using a non-fungible token (NFT) recorded in a blockchain.

7. A method for generating a moment asset to represent interactive activity that occurred during a session of gameplay of a game, comprising:
   executing an instance of the game, wherein the executing generates state data descriptive of interactive activity occurring during the session of gameplay of the game;
   examining the state data by a machine learning process, wherein the machine learning process is configured to extract features from the state data for classification;
   outputting, by the machine learning process, two or more images and at least one text descriptor of interactive activities that occurred during the session of gameplay of the game; and
   inputting the two or more images and the at least one text descriptor to an image generation process with priority data to influence a definition of digital content for the moment asset, wherein the digital content is a selective representation of certain interactive activity of a user that occurred during the session of gameplay of the game, wherein the moment asset comprises a combination of the two or more images that occurred during the session of gameplay output in a hybrid collage format, and wherein a first portion of the moment asset includes a first collage of the two or more images and has a first format, and wherein a second portion of the moment asset includes a second collage of the two or more images and has a second format different from the first format, wherein the first format and the second format each defines an arrangement of the two or more images within the moment asset.

8. The method of claim 7, wherein the digital content is usable to construct the hybrid collage format to represent the moment asset, and wherein the image generation process comprises an image generation artificial intelligence process.

9. The method of claim 7, wherein the moment asset further comprises a video, and wherein the digital content is usable to construct the video.

10. The method of claim 7, wherein the moment asset further comprises a three-dimensional physical asset, and wherein the digital content is usable to construct the three-dimensional physical asset.

11. The method of claim 10, wherein the three-dimensional physical asset is a statue, statuette, or figurine.

12. The method of claim 10, wherein the three-dimensional physical asset is a medal or token.

13. The method of claim 10, wherein the moment asset is certified to be authentic using a non-fungible token (NFT) recorded in a blockchain.

14. The method of claim 11, wherein the statue, statuette, or figurine is certified to be authentic using a non-fungible token (NFT) recorded in a blockchain.

15. The method of claim 12, wherein the medal or token is certified to be authentic using a non-fungible token (NFT) recorded in a blockchain.

16. A non-transitory computer readable medium comprising program instructions for generating a moment asset to represent interactive activity that occurred during a session of gameplay of a game, wherein execution of the program instructions by one or more processors of a computer system causes the one or more processors to perform operations comprising:
   executing an instance of the game, wherein the executing generates state data descriptive of interactive activity occurring during the session of gameplay of the game;
   examining the state data by a machine learning process, wherein the machine learning process is configured to extract features from the state data for classification;
   outputting, by the machine learning process, two or more images and at least one text descriptor of interactive activities that occurred during the session of gameplay of the game; and
   inputting the two or more images and the at least one text descriptor to an image generation process with priority data to influence a layout of image content for the moment asset, wherein the image content is a selective representation of certain interactive activity of a user that occurred during the session of gameplay of the game, wherein the moment asset comprises a combination of the two or more images of interactive activities that occurred during the session of gameplay output in a hybrid collage format, and wherein a first portion of the moment asset includes a first collage of the two or more images and has a first format, and wherein a second portion of the moment asset includes a second collage of the two or more images and has a second format different from the first format, wherein the first format and the second format each defines an arrangement of the two or more images within the moment asset.

17. The non-transitory computer readable medium of claim 16, wherein the image generation process comprises an image generation artificial intelligence process.

18. The non-transitory computer readable medium of claim 16, wherein the first portion of the moment asset is comprised of a structurally-arranged collage in which images of interactive activities that occurred during the session of gameplay of the game are arranged in an order based on priority ranking.

19. The non-transitory computer readable medium of claim 16, wherein the first portion of the moment asset is comprised of an arbitrarily-blended collage in which images of interactive activities that occurred during the session of gameplay of the game are randomly arranged.

20. The non-transitory computer readable medium of claim 16, wherein the moment asset is certified to be authentic using a non-fungible token (NFT) recorded in a blockchain.

* * * * *